United States Patent [19]

Frain

[11] Patent Number: 4,759,336
[45] Date of Patent: Jul. 26, 1988

[54] DOUBLE UNDERWATER SPEARGUN

[76] Inventor: Patrick F. Frain, 628 SE. 5th St., #5, Delray Beach, Fla. 33483

[21] Appl. No.: 912,110

[22] Filed: Sep. 26, 1986

[51] Int. Cl.[4] .............................................. F41B 7/00
[52] U.S. Cl. ........................................ 124/22; 124/31; 124/38; 124/40
[58] Field of Search ............. D22/102; 124/17, 35 R, 124/40, 19, 20 B, 22, 16

[56] References Cited

U.S. PATENT DOCUMENTS

| D. 221,966 | 9/1971 | Howe | 124/19 |
|---|---|---|---|
| 1,845,920 | 2/1932 | Jones | 124/35 R |
| 2,730,094 | 1/1956 | Hicks | 124/19 |
| 2,888,004 | 5/1959 | Steiner | 124/16 |

Primary Examiner—Richard C. Pinkham
Assistant Examiner—T. Brown

[57] ABSTRACT

An underwater speargun consisting of two spears that are independent of each other. This underwater speargun is capable of 2 rapid discharges of spears or 2 simultaneous discharges of spears. Accidental firing is prevented due to the safety blocking the trigger until the trigger and the safety trigger are squeezed rearward at the same time. Grooved tracks and front spear guides help insure the spear propels out of the gun in a straight path.

10 Claims, 1 Drawing Sheet

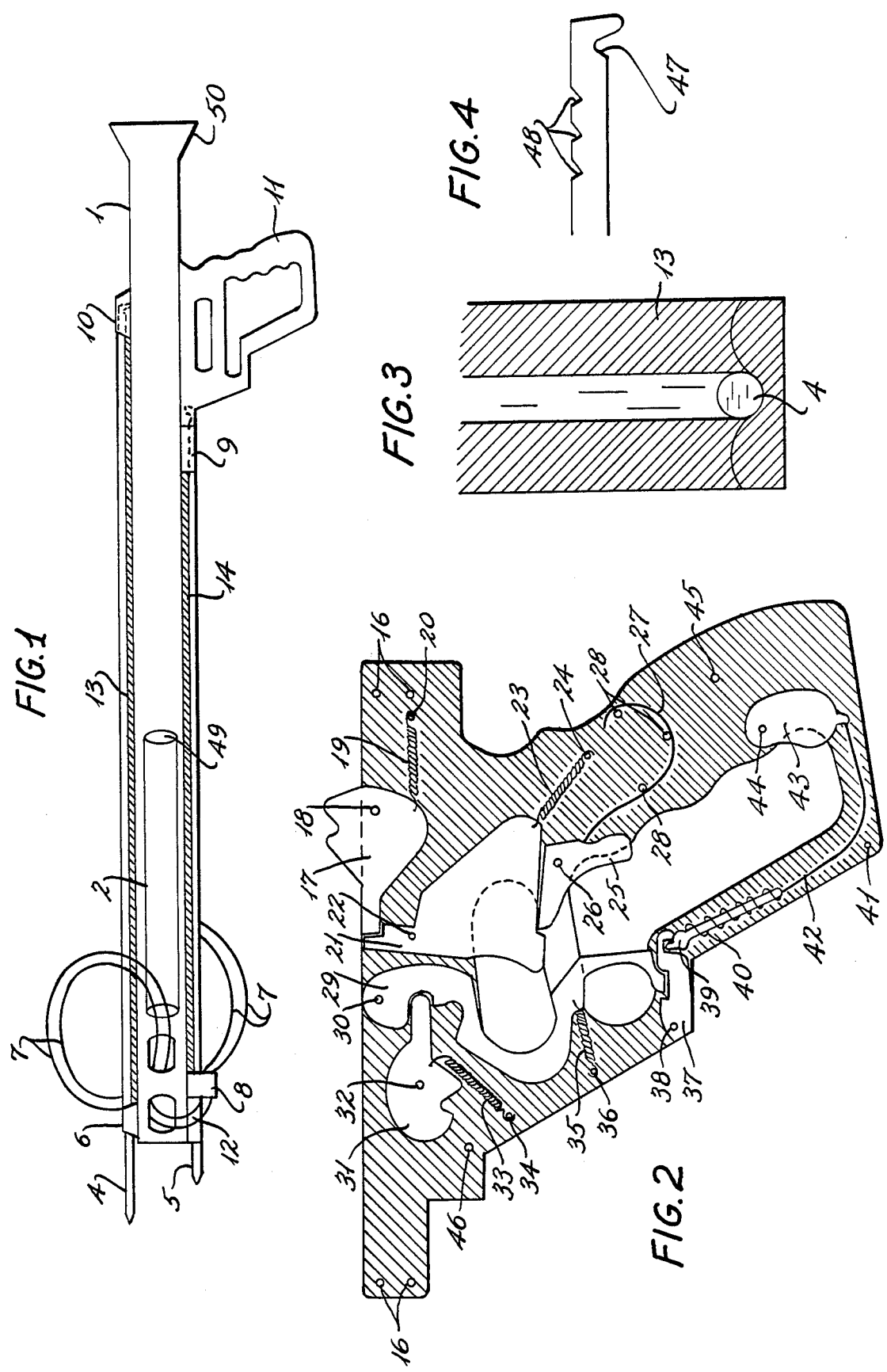

DOUBLE UNDERWATER SPEARGUN

This invention relates in general to guns, and more specifically guns intended primarily for underwater use.

While this invention has particular utility in connection with underwater spearguns, it is to be understood that its utility is not confined thereto.

Underwater spearguns provide the the rapid discharge of only one spear at one time. There are some models that provide for the discharge of spears in succession, necessitating a bit of maneuvering and action. This speargun has two spears in a loaded position capable of discharging by squeezing each trigger and safety trigger in one motion. This is of enormous protection value to the spearfisherman. Shooting a fish underwater usually attracts large predator fish to the vicinity. With this speargun the diver has another spear ready to discharge with just a hand motion. If a diver felt he was in a serious situation and both spears were loaded in the speargun, he could depress both triggers for dual impact and killing power.

An object of this invention is to provide an improved gun capable of releasing more than one (1) spear.

Another object of this invention is to provide a gun that is neutrally buoyant and is easier to aim and fire.

Still another object of this invention is to provide support for the spear as it travels the length of the barrel of the gun.

A further object of the invention is the trigger locking features that lock the spears in position until the trigger and the safety trigger are squeezed rearward.

FIG. 1 is a side elevation of the gun.

FIG. 2 is a sectional view of the handle assembly.

FIG. 3 is a sectional view of the track the spear sides on.

FIG. 4 is a sectional view of the spear.

Referring more particularly to drawing 1, there is shown a side view of the gun. The barrel (1) is square in shape and is filled with foam from the handle (11) forward to the elastic holder (8). This could also be left empty and fitted with airtight caps on each end. This increases the buoyancy of the barrel to neutral buoyancy and helps eliminate the tendency of the gun to point downward instead of straight ahead. Attached to the barrel (1) are 2 buoyancy control cylinders (2). The buoyancy control cylinders (2) are fastened to each side of the barrel (1). The buoyancy control cylinders (2) can be filled with foam or left empty. The buoyancy control cylinders (2) are then sealed on each end to form an airtight chamber. This invention uses end caps (49), but other means can be used to seal each cylinder. This also increases the buoyancy of the gun to neutral buoyancy.

On the upper side of the barrel (1) an upper channeled spear support (13) is fastened. The upper spear (4) rests on this track (13). This insures the spear (4) propels out of the gun straight. The upper spear (4) slides through the upper receiver (10). The upper receiver (10) houses the upper sear mechanism (17). The downturned notched end of the spear (47) hooks into the upper sear (17) and locks it into position. The spearpoint end of the spear extends out the front end of the barrel (1). At this end of the barrel (1) on the upperside is the upper spear guide (6). The upper spear (4) rides through the upper spear guide (6) which keeps the upper spear (4) traveling straight out of the gun.

The lower spear (5) is seated into a lower receiver (9) located in front of the handle (11) of the gun. The lower spear (5) is guided through the channeled spear support (14) which is fastened to the lower spear guide (12). The lower spear guide (12) is t-shaped with the lower spear (5) traveling through a bore in the vertical section and the 2 elastic bands (7) for the lower spear (5) looped through an opening in the horizontal section. Two elastic bands (7) are looped through elastic holders (8) for each spear (4) and (5). Two elastic bands (7) are looped through the front elastic holder (8) for the bottom spear (5) and two elastic bands (7) are looped through the rear elastic holder (8) for the top spear (4). The rear portion of these elastic bands (7) is pulled rearward to lock into 3 notches (48) in the top rear of each spear (4) & (5). These elastic bands (7) enable the spears (4) & (5) to propel out of the speargun.

At the rear end of the barrel (1) is the gun butt (50). The gun butt (50) cushions the shock of the recoil of the gun.

Referring to FIG. 2 is a sectional view of the handle (11) of the speargun. It is slid up into an opening on the bottom of the barrel (1) near the rear a few inches forward of the gun butt (50). The handle (11) is fastened to the barrel (1) by four screws (16). The handle (11) can be fastened by other means as long as it can be taken apart and put back together as often as necessary.

The upper sear (17) which is housed in the upper receiver (10) is fastened by a pivot pin (18) and an extension spring (19) that is secured to a stationary pin (20). The upper sear (17) releases the downturned notch of the upper spear (4) when the upper trigger (21) and the upper safety trigger (25) are squeezed rearward. Insertion of the upper spear (4) against the upper sear (17) pushes the upper sear (17) around into position and the upper trigger (21) into firing position with the safety trigger (25) blocking the upper trigger (21) against accidental firing. The upper trigger (21) is secured by a pivot pin (22) and an extension spring (23) from the bottom corner to a stationary pin (24). The upper safety trigger (25) blocks the upper trigger (21) from accidental firing. The upper safety trigger (25) is secured by a pivot pin (26) and a safety return spring (27). The safety return spring (27) is a flat constant force spring supported around 3 stationary pins (28).

The lower spear (5) travels through the lower receiver (9) into a grooved section of the handle (11) where the lower spear (5) locks into the lower sear (31). The lower sear (31) is secured by a pivot pin (32) and an extension spring (33) to a stationary pin (34). Squeezing the lower trigger (29) and the lower safety trigger (43) rearward forces the lower sear (31) to release the lower spear (5). The lower trigger (29) is secured by a pivot pin (30) and an extension spring (35) to a stationary pin (36). Insertion of the lower spear (5) against the lower sear (31) pushes the lower sear (31) around into position and the lower trigger (29) into firing position with the safety latch (37) blocking the lower trigger (29) against accidental firing.

The lower safety latch (37) is secured by a pivot pin (38) and a rod (39) that fits up into the lower safety latch (37). The rod (39) also has a wire (40) extending from the bottom end. The wire (41) is secured in place around a stationary pin (42) and is fastened to the bottom of the lower safety trigger (43). The lower safety trigger (43) is also secured by a pivot pin (44) at its top end.

The two sides of the handle (11) are fastened together by screws (45) and (46).

FIG. 3 shows the sectional view of the upper spear (4) in the channeled spear support (13). It is the same for the lower spear (5) and lower channeled spear support (14), except that its position is reversed.

FIG. 4 shows the rear end of the spears (4) and (5). The bottom tail end has a downward notch (47) to catch the sears (17) and (31). The three notches (48) on the top of the spear are to connect the elastic bands (7) to the spear (4) and (5).

It should be noted that since this is an underwater speargun, that all parts should be made of materials that are resistant to the corrosive action of the sea. Materials could also be plated with corrosion resistant material.

It is thought that the advantages of this invention will be understood from the foregoing description. Numerous changes may be made which will readily suggest themselves to those skilled in the art and are encompassed in the spirit of this invention as disclosed and as defined in these claims.

I claim:

1. An underwater speargun comprising:
an elongated tubular barrel having a forward end, a rear end, and an upper and lower spear support means, a hollow hand grip attached intermediate the ends of said barrel, upper and lower pivotally attached trigger means located inside said hand grip, upper and lower pivotally attached sear means engaging respective ones of said trigger means, first and second elongated spear means for slidably engaging said spear support means, each of said spear means having means at one of its ends for releasably engaging said first and second sear means and further having at said one end means for releasably attaching sear propelling means; upper and lower safety means for automatically locking said respective trigger and sear means and to release said sear means when said trigger and safety means are simultaneously activated, said sear spear propelling means being elastic means attached to and stretched from the forward end of said barrel and attached to respective ones of said spear means at one end, and at least one tubular structure attached to said speargun and sealed at its ends to form an airtight chamber whereby the buoyancy of said speargun is increased to achieve neutral buoyancy under water.

2. Speargun as recited in claim 1 wherein said lower and upper trigger means are longitudinally spaced apart so as to be operated independent of each other.

3. Speargun as recited in claim 1 wherein said each spear support means is a contoured channel for receiving said spear means whereby said spear means are guided in a precise path out of said spear supports toward the target.

4. Speargun of claim 1 wherein said elongated barrel is substantially square in shape.

5. Speargun of claim 4 wherein said elongated barrel is sealed forming an airtight chamber whereby the buoyancy of said speargun is increased to achieve neutral buoyancy underwater.

6. Speargun as recited in claim 4 wherein said elongated barrel is filled with foam and sealed whereby the buoyancy of said speargun is increased to achieve neutral buoyancy underwater.

7. Speargun as recited in claim 1 wherein said hollow tubular structures are filled with a foam and sealed with airtight caps whereby the buoyancy is increased to achieve neutral buoyancy underwater.

8. Speargun as recited in claim 1 wherein said spear means are substantially cylindrical and said sear engaging means is diametrically positioned on said sear means relative to the position of said means for releasably attaching said spear propelling means.

9. Speargun as in claim 8 wherein said means for releasably attaching said spear propelling means is a plurality of linear and spaced notches whereby the propelling force of each said spear may be adjusted.

10. Speargun of claim 9 wherein said spear propelling means is a plurality of elastic bands, each band engaging a respective one of said notches.

* * * * *